United States Patent
Kawano et al.

(10) Patent No.: US 10,816,433 B2
(45) Date of Patent: Oct. 27, 2020

(54) LEAKAGE INSPECTION METHOD AND LEAKAGE INSPECTION DEVICE FOR CONTAINER TO BE INSPECTED

(71) Applicant: JGC JAPAN CORPORATION, Yokohama (JP)

(72) Inventors: Masahiro Kawano, Kanagawa (JP); Takeshi Kojima, Kanagawa (JP); Yasubumi Kato, Kanagawa (JP); Megumi Tazawa, Kanagawa (JP); Yimeng Xu, Kanagawa (JP)

(73) Assignee: JGC JAPAN CORPORATION, Yokohama (JP)

( * ) Notice: Subject to any disclaimer, the term of this patent is extended or adjusted under 35 U.S.C. 154(b) by 199 days.

(21) Appl. No.: 16/084,237

(22) PCT Filed: Mar. 8, 2017

(86) PCT No.: PCT/JP2017/009180
§ 371 (c)(1),
(2) Date: Sep. 12, 2018

(87) PCT Pub. No.: WO2017/159481
PCT Pub. Date: Sep. 21, 2017

(65) Prior Publication Data
US 2019/0056285 A1    Feb. 21, 2019

(30) Foreign Application Priority Data
Mar. 15, 2016    (JP) .................................. 2016-050995

(51) Int. Cl.
*G01M 3/22*        (2006.01)
*G01M 3/32*        (2006.01)

(52) U.S. Cl.
CPC ............ *G01M 3/229* (2013.01); *G01M 3/227* (2013.01); *G01M 3/3209* (2013.01); *G01M 3/3218* (2013.01); *G01M 3/3263* (2013.01)

(58) Field of Classification Search
CPC .... G01M 3/229; G01M 3/227; G01M 3/3209; G01M 3/3218; G01M 3/3263
See application file for complete search history.

(56) References Cited

U.S. PATENT DOCUMENTS 6,460,405 B1 *  10/2002  Mayer ..................... G01M 3/20
                                                                    73/40.7
6,851,316 B2 *   2/2005  Micke ..................... G01M 3/02
                                                                     73/40

(Continued)

FOREIGN PATENT DOCUMENTS

JP    2002005777    1/2002
JP    2003240668    8/2003

(Continued)

OTHER PUBLICATIONS

English translation for JP-2011179975-A, see attached document. (Year: 2010).*

(Continued)

*Primary Examiner* — Xin Y Zhong
(74) *Attorney, Agent, or Firm* — JCIPRNET

(57) ABSTRACT

A leakage inspection method and leakage inspection device for container to be inspected are provided. When a container to be inspected having a deformable flexible part is to be inspected for leakage, the container to be inspected is filled with an inspection gas containing helium, the container to be inspected, which has been filled with the inspection gas, is disposed in an inspection chamber partitioned from the outside, and an upward flow of a carrier gas is formed from the lower part to the upper part of the container to be inspected. A leakage of the inspection gas filled in the (Continued)

container to be inspected is then detected on the basis of the result of measuring the concentration of helium in the carrier gas collected at a position higher than a position where the carrier gas is fed into the inspection chamber.

9 Claims, 6 Drawing Sheets

(56) References Cited

U.S. PATENT DOCUMENTS

| | | | |
|---|---|---|---|
| 8,534,120 B1 | 9/2013 | Pavlik | |
| 8,910,509 B2 * | 12/2014 | Terentiev | G01M 3/229 73/40 |
| 2004/0159144 A1 * | 8/2004 | Abelen | G01M 3/227 73/49.3 |
| 2005/0143939 A1 | 6/2005 | Harada et al. | |

FOREIGN PATENT DOCUMENTS

| | | | |
|---|---|---|---|
| JP | 2010507426 | | 3/2010 |
| JP | 2011179975 | | 9/2011 |
| JP | 2011179975 A | * | 9/2011 |
| JP | 2012514743 | | 6/2012 |
| WO | 2015140042 | | 9/2015 |

OTHER PUBLICATIONS

"International Search Report (Form PCT/ISA/210) of PCT/JP2017/009180," dated May 16, 2017, with English translation thereof, pp. 1-4.

"Search Report of Europe Counterpart Application", dated Oct. 17, 2019, p. 1-p. 8.

"Office Action of Taiwan Counterpart Application", dated Jun. 30, 2020, with English translation thereof, p. 1-p. 15.

* cited by examiner

LEAKAGE INSPECTION METHOD AND LEAKAGE INSPECTION DEVICE FOR CONTAINER TO BE INSPECTED

CROSS-REFERENCE TO RELATED APPLICATION

This application is a 371 application of the International PCT application serial no. PCT/JP2017/009180, filed on Mar. 8, 2017, which claims the priority benefit of Japan Patent Application No. 2016-050995, filed on Mar. 15, 2016. The entirety of each of the abovementioned patent applications is hereby incorporated by reference herein and made a part of this specification.

TECHNICAL FIELD

The present disclosure relates to a technology of detecting leakage in a container to be inspected having a deformable flexible portion.

BACKGROUND ART

A single-use bag (which will hereinafter be referred to as a "SUB") utilized in a pharmaceutical product manufacturing process, a bioprocess, and the like is a container constituted of a deformable resin sheet or the like. The SUB can be compactly folded in an empty state. On the other hand, the SUB can be deformed in accordance with filling of contents and can accommodate a predetermined amount of contents.

Meanwhile, the SUB has lower strength than a rigid (highly rigid) container, and sometimes the SUB is not an integrally molded product. Accordingly, it is relatively easy for contents to leak due to machining failure or damage. Sometimes a leakage inspection is performed before shipment of the SUB from a manufacturer, but it may be difficult to detect a small pinhole. In addition, it is not possible to cope with damage in a process of transportation after shipment or being prepared for use.

Therefore, there have been attempts by users to perform a leakage inspection before the SUB is used. However, in an SUB of which the shape changes in accordance with a temperature change or a change in an internal pressure, it is difficult to employ a pressure dropping method for detecting leakage based on a pressure drop inside a pressurized SUB.

In addition, when applying a decompression method in which an SUB filled with helium is disposed inside a vacuum container and leakage is detected based on a change in concentration of helium inside the vacuum container, since a significant differential pressure cannot be applied to the SUB, it is difficult to quickly detect leakage. Moreover, there are large-sized SUBs exceeding 1,000 liters, and the equipment burden becomes excessive when performing the decompression method by introducing a vacuum container which allow inspection of a large-sized SUB.

Here, Patent Literature 1 discloses a technology according to a sniffer method for suctioning ambient air around a test object filled with helium as a test gas using a suctioning pipe and detecting helium by means of a test gas detector. However, the sniffer method, in which a surface of a container to be inspected having a relatively large surface area such as an SUB is thoroughly suctioned and scanned to identify a very small leakage spot such as a pinhole, not only takes time but also leads to a possibility that leakage will be overlooked.

In addition, Patent Literature 2 discloses a technology in which helium is introduced into a space on one side of a cell accommodating a polymer permeable membrane, and air is caused to flow through a space on the other side of the cell having the polymer permeable membrane interposed therebetween, thereby allowing distinguishing between permeation of helium through the polymer permeable membrane and leakage due to pinholes, defects, or the like based on a difference in the graph of change in concentration of helium discharged from the cell.

In the technology disclosed in Patent Literature 2, a cell such as a fuel cell is utilized as it is, and the concentration of helium is measured while supplying and withdrawing air through an introduction gateway provided on a side wall surface of the cell used as the introduction gateway for an oxidizing gas when the fuel cell is in use.

However, since helium is extremely light compared to air, the helium which has passed through a polymer permeable membrane stays in a space on an upper portion side of the cell. Therefore, it takes a long time until the helium in a region in which it stays in a high concentration reaches a height position at which air is withdrawn, so that leakage cannot be quickly detected.

REFERENCE LIST

Patent Literature

[Patent Literature 1]
PCT Japanese Translation Patent Publication No. 2012-514743
[Patent Literature 2]
Japanese Unexamined Patent Application Publication No. 2002-5777

SUMMARY OF INVENTION

The present invention has been made under such circumstances and provides a leakage inspection method for a container to be inspected, in which leakage in the container to be inspected can be accurately and quickly detected, and a leakage inspection device.

According to the present disclosure, there is provided a leakage inspection method for a container to be inspected having a deformable flexible portion. The leakage inspection method for a container to be inspected includes a step of filling the container to be inspected, with an inspection gas containing helium; a step of disposing the container to be inspected filled with the inspection gas inside an inspection chamber partitioned from outside, and forming an upward flow of a carrier gas, of which a concentration of contained helium is different from the concentration of helium contained in the inspection gas, from a lower portion side toward an upper portion side of the container to be inspected; and a step of detecting leakage of the inspection gas filled in the container to be inspected, based on measurement results of a concentration of helium in the carrier gas gathered at a position higher than a position at which the carrier gas is supplied to the inside of the inspection chamber.

In addition, according to another disclosure, there is provided a leakage inspection device for a container to be inspected having a deformable flexible portion. The leakage inspection device includes an inspection chamber which is partitioned from outside and in which the container to be inspected filled with an inspection gas containing helium is disposed; a carrier gas supply portion which supplies a carrier gas, of which a concentration of contained helium is different from the concentration of helium contained in the inspection gas, to a lower portion side of the inspection chamber; an exhaust portion which exhausts the carrier gas from a position above the container to be inspected in order to form an upward flow of the carrier gas from the lower portion side toward an upper portion side of the inspection chamber; and a sampling portion which gathers the carrier gas at a position higher than the carrier gas supply portion in order to detect leakage of the inspection gas filled in the container to be inspected, based on measurement results of a concentration of helium contained in the carrier gas.

DESCRIPTION OF EMBODIMENTS

Figure 1:
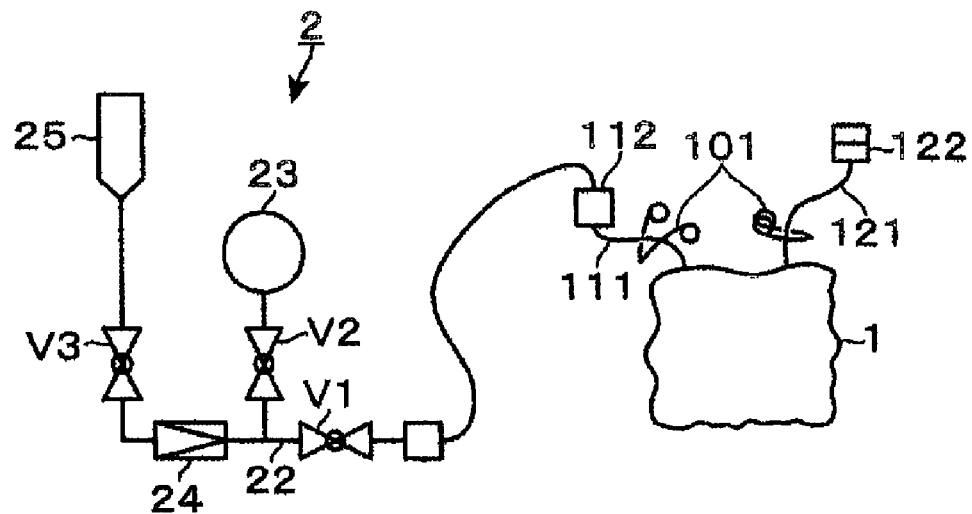
FIG. 1 illustrates an SUB being filled with helium.

A leakage inspection method for a container to be inspected according to an embodiment of the present disclosure may further have the following features.
  (a) The method may include a step of filling the container to be inspected, with contents inside an inspection chamber when leakage of an inspection gas is not detected.
  (b) The method may include a step of collecting the inspection gas filled in the container to be inspected, after a step of detecting leakage of the inspection gas.
  (c) An exhaust portion for a carrier gas may be provided in the inspection chamber at a position above the container to be inspected disposed inside the inspection chamber, and the carrier gas may be gathered at a height position between a position at which the carrier gas is supplied to the inside of the inspection chamber, and the exhaust portion.
  (d) The container to be inspected may be a deformable bag-shaped container.
  (e) The inspection chamber may be a bag-shaped cover covering a space around the container to be inspected. In this case, the container to be inspected may be disposed inside a receptacle holding the container to be inspected, and the inspection chamber may be configured to cover the receptacle and the container to be inspected inside the receptacle with the bag-shaped cover.
  (f) A filling pressure of the inspection gas with respect to the container to be inspected may be higher than 0 PaG and may be less than an upper limit value for a withstanding pressure of the container to be inspected.
  (g) A ratio of a flow rate of the carrier gas to a volume of a remaining space inside the inspection chamber in a state in which the container to be inspected is accommodated may be a value within a range of 0.01 to 0.05 vvm.

Each of the features (a) to (g) may be an independent feature, or the features may be arbitrarily combined.

In addition, in detection of leakage of an inspection gas, the container to be inspected may be filled with contents when leakage of the inspection gas is not detected, and the inspection gas filled in the container to be inspected may be collected after leakage of the inspection gas is detected.

The exhaust portion for the carrier gas is provided at a position above the container to be inspected disposed inside the inspection chamber, and a sampling portion gathers the carrier gas at a position between a position at which the carrier gas is supplied to the inside of the inspection chamber, and the exhaust portion.

The container to be inspected may be a deformable bag-shaped container, and the inspection chamber may be a bag-shaped cover covering a space around the container to be inspected. The container to be inspected may be disposed inside the receptacle holding the container to be inspected, and the inspection chamber may be configured to cover the receptacle and the container to be inspected inside the receptacle with the bag-shaped cover.

The filling pressure of the inspection gas with respect to the container to be inspected may be higher than 0 PaG and may be less than the upper limit value for the withstanding pressure of the container to be inspected. The ratio of the flow rate of the carrier gas to the volume of the remaining space inside the inspection chamber in a state in which the container to be inspected is accommodated may be a value within a range of 0.01 to 0.05 vvm.

Next, with reference to FIGS. 1 and 2, an aspect of the embodiment of the present disclosure will be described as an example.

Figure 2:
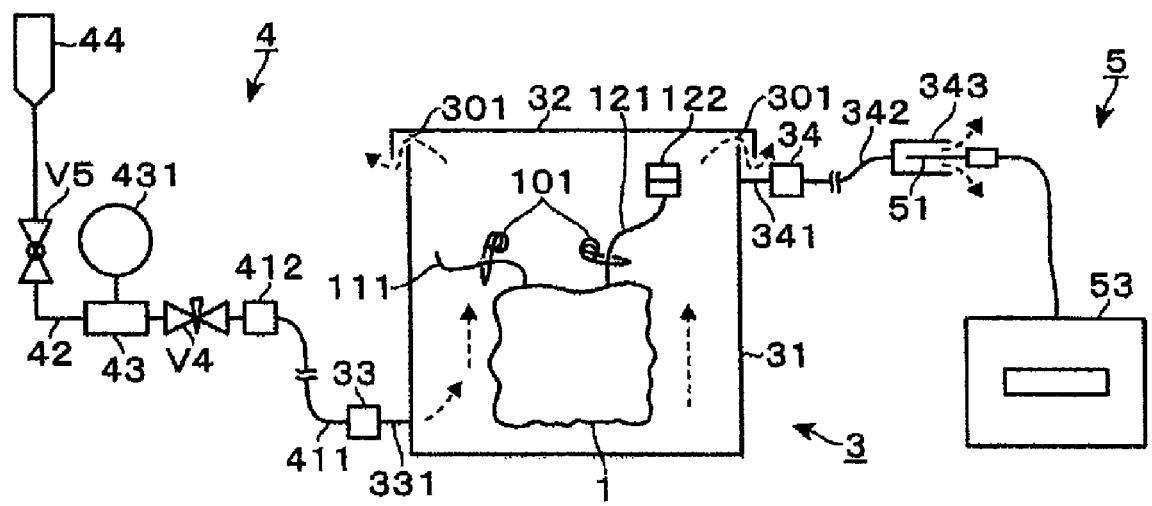
FIG. 2 illustrates an SUB in which a leakage inspection is performed inside an inspection container.

FIG. 1 illustrates an operation of filling an SUB 1 (container to be inspected) with a helium gas (inspection gas), and FIG. 2 illustrates an operation of detecting leakage in the SUB 1 inside an inspection container 3 (inspection chamber).

The single-use bag (SUB) 1 in which a leakage inspection method according to the embodiment can be applied need only be a container having a shape deformable in accordance with filling of contents, and its configuration is not particularly limited. An envelope-type 2D SUB 1 constituted of a sheet made of resin, and a 3D-type SUB 1 formed into a rectangular parallelepiped shape or a cylindrical shape in accordance with filling of contents can be exemplified. When the SUB 1 is constituted of only a deformable material such as a sheet made of resin, the SUB 1 in its entirety becomes a flexible portion having flexibility.

In addition, the SUB 1 may be configured to be combined with a structural material forming a part of the shape, such as a bottom plate made of resin or a strut made of resin. In this case, deformable parts other than the structural material become the flexible portions having flexibility.

The SUB 1 is used for accommodating contents including intermediate products, products, and catalysts which can be handled in a pharmaceutical product manufacturing process; and treatment substances, microorganisms, and the like handled in a bioprocess. The contents may be a liquid or particulate matter. In addition, a gas-phase part which is not filled with the contents may be present inside the SUB 1 after being filled with the contents.

The SUB 1 includes single-use tubes made of resin for filling or withdrawing contents. In the example illustrated in FIGS. 1 and 2, the SUB 1 includes two single-use tubes. In accordance with the purpose of its use, the single-use tubes are named a gas tube 111 and a drug solution tube 121 respectively (the same applies to the SUB 1 in FIGS. 3 to 8 described below).

A connector 112 connected to a sampling gas supply mechanism 4 (which will be described below) is provided in a terminal portion of the gas tube 111, and an aseptic connector 122 used at the time of filling of contents is provided in a terminal portion of the drug solution tube 121.

However, the purpose of use of the single-use tubes is not limited to purposes corresponding to the above-described names applied for convenience and can be freely selected in accordance with a handling operation of the SUB 1 in each process. In addition, in regard to the number of single-use tubes provided in the SUB 1, one, two, or more single-use tubes may be provided.

In the embodiment according to the present disclosure, the SUB 1 as a target of a leakage inspection is filled with the helium gas. In the example illustrated in FIG. 1, with respect to the SUB 1 which is not in a state of being filled with contents, the connector 112 on the gas tube 111 side of the two single-use tubes is connected to a helium gas filling mechanism 2. Meanwhile, the drug solution tube 121 is closed by a pinch cock 101 such that the helium gas filled in the SUB 1 does not flow out.

The helium gas filling mechanism 2 has a structure including a regulator 24 provided in a helium supply line 22 through which the helium gas supplied from a helium supply source 25 flows. An indicated value of a micromanometer 23 provided on a downstream side of the regulator 24 is set as the pressure inside the SUB 1, and a pressure on a secondary side is adjusted by using a pressure adjustment handle (not illustrated) provided in the regulator 24, so that the filling pressure of the helium gas filled in the SUB 1 can be adjusted. The reference signs V1 to V3 indicate on-off valves constituted of ball valves or the like.

The helium gas supplied from the helium supply source 25 contains helium. The helium gas need only have a concentration of contained helium different from that of the carrier gas described below, and the concentration of helium is not particularly limited. For example, when preparing a helium gas having a higher concentration than the concentration of helium in the carrier gas, a helium gas having a concentration of helium of 99 volume % (0° C., based on one atmosphere pressure, the same applies hereinafter) or higher may be used, or a helium gas diluted with nitrogen or oxygen may be used.

However, the greater the difference between the concentrations of helium in the helium gas and the carrier gas, the more improved the detection sensitivity for leakage in the SUB 1 becomes, so that leakage can be more quickly detected. From this viewpoint, when ambient atmospheric air (air: concentration of contained helium of approximately 5 ppm by volume) is used as the carrier gas, a helium gas having a concentration of helium of 1 volume % or higher, more preferably, 10 volume % or higher is used. Examples of gases other than helium to be mixed in the helium gas can include a nitrogen gas, an oxygen gas, and atmospheric air.

The filling pressure of the helium gas filled in the SUB 1 can be set to a value higher than 0 PaG and less than the upper limit value for the withstanding pressure of the SUB 1. For example, as illustrated in Examples described below, leakage can be detected at a filling pressure of approximately 2 kPaG.

When the SUB 1 is filled with the helium gas to the filling pressure set in advance, the gas tube 111 is closed by the pinch cock 101, and the gas tube 111 is separated from the connector 112. Thereafter, the SUB 1 is disposed inside the inspection container 3.

The inspection container 3 can include a container main body 31 of which an upper surface side is open and a lid 32 which covers an opening of the container main body 31 from the upper surface side. The container main body 31 has an inner volume to be able to accommodate the SUB 1 and to form a gap through which the carrier gas flows between the container main body 31 and the SUB 1.

In addition, the inspection container 3 has a configuration in which a gap flow channel 301 is formed between an opening edge of the container main body 31 and a lower surface of the lid 32 when the opening of the container main body 31 is covered with the lid 32. The technique of forming the gap flow channel 301 is not particularly limited. A gap forming member (not illustrated) may be disposed between the opening edge of the container main body 31 and the lower surface of the lid 32, or an upper end of the opening edge of the container main body 31 may be partially cut out. The gap flow channel 301 corresponds to an exhaust portion for exhausting the carrier gas from the inspection container 3.

An atmospheric air supply pipe 331 which is a carrier gas supply portion for supplying the carrier gas to the inside of the inspection container 3 is connected to a lower portion side on a side wall surface of the inspection container 3. A connection position of the atmospheric air supply pipe 331 is not particularly limited as long as an upward flow of the carrier gas can be formed around the SUB 1 disposed inside the inspection container 3 as described below.

For example, the atmospheric air supply pipe 331 is connected at a height position within a range of the lower half of the overall height of the container main body 31, and is more preferably connected at a height position within a range of the lower third of the overall height. Furthermore, the atmospheric air supply pipe 331 may be connected to a bottom surface of the container main body 31.

In addition, the number of atmospheric air supply pipes 331 connected to the container main body 31 is not limited to one. For example, a plurality of atmospheric air supply pipes 331 may be connected with spaces among thereof along a circumferential direction of the container main body 31 on the side wall surface.

A connector 33 is provided in an upstream end portion of the atmospheric air supply pipe 331 and is connected to the sampling gas supply mechanism 4 via a coupling line 411 constituted of a single-use tube. The sampling gas supply mechanism 4 supplies atmospheric air (carrier gas) to the inspection container 3.

The sampling gas supply mechanism 4 has a structure in which a flowmeter 43 and a flow rate adjusting valve V4 constituted of a needle valve for adjusting a flow rate are disposed in an atmospheric air supply line 42 through which atmospheric air supplied from an atmospheric air supply source 44 configured as an air pump flows, an air blower, or the like flows. A connector 412 coupled to the coupling line 411 is provided in a downstream end portion of the atmospheric air supply line 42. The reference sign V5 indicates an on-off valve constituted of a ball valve or the like.

As described above, atmospheric air contains helium of approximately 5 ppm by volume. However, its concentration of contained helium is different compared to a helium gas of which the concentration of helium is 10 volume % or higher, for example, and atmospheric air is easily obtained. Therefore, in the embodiment according to the present disclosure, atmospheric air is employed as the carrier gas used when detecting leakage of the helium gas from the SUB 1.

The carrier gas is not limited to a case of using atmospheric air. For example, a nitrogen gas or the like in which the concentration of helium is less than a lower detection limit may be employed. In addition, the carrier gas may contain helium in a concentration equal to or higher than the concentration of helium in atmospheric air. However, for example, if the carrier gas contains helium of 1 volume % or more, sometimes sufficient detection sensitivity cannot be obtained on a helium detector 5 side (which will be described below).

The flow rate of the carrier gas supplied to the inside of the inspection container 3 can be adjusted to a predetermined value by using the sampling gas supply mechanism 4 described above and adjusting the opening degree of the flow rate adjusting valve V4 while observing the indicated value of a flow rate indicating portion 431 provided in the flowmeter 43.

Here, the flow rate of the carrier gas supplied from the sampling gas supply mechanism 4 is adjusted such that the ratio (=F/V [vvm]) of a supply flow rate F [liters/min] of the carrier gas to a volume V [liters] of the remaining space inside the inspection container 3 in a state of accommodating the SUB 1 becomes a value within a range of 0.01 to 0.05 vvm. If this value is smaller than 0.01 vvm, when leakage occurs in the SUB 1, it takes a long time until the concentration of helium measured by gathering the carrier gas becomes stabilized.

On the other hand, if the value is greater than 0.05 vvm, the concentration of helium measured by gathering the carrier gas becomes low, and detection sensitivity for leakage is reduced.

Returning to description of the configuration of the inspection container 3, a sampling pipe 341 which is a sampling portion for gathering the carrier gas flowing inside the inspection container 3 is connected to an upper portion side of the side wall surface of the container main body 31. The connection position of the sampling pipe 341 is set to a height position within a range of the upper half of the overall height of the container main body 31. As described below, since helium has a high diffusion rate, even if the connection position of the sampling pipe 341 is lower than the height position of the upper end of the SUB 1 inside the container main body 31, it is possible to detect leakage which has occurred on the upper surface side of the SUB 1. For example, even at a position approximately several centimeters lower than the height position of the upper end of the SUB 1 inside the container main body 31, it has been experimentally checked that leakage which has occurred on the upper surface side of the SUB 1 can be detected.

A connector 34 is provided in the terminal portion of the sampling pipe 341 and is connected to a sampling port 343 via a coupling line 342 constituted of a single-use tube. A part of the carrier gas flowing inside the inspection container 3 flows into the sampling port 343 via the sampling pipe 341 and the coupling line 342.

The carrier gas can be suctioned into a main body portion 53 of the helium detector 5 and the concentration of helium can be measured by inserting a probe 51 of the helium detector 5 into the sampling port 343. When the helium gas which has leaked from the SUB 1 is contained in the carrier gas (concentration of helium: approximately 5 ppm by volume), the leakage is detected as a rise of the concentration of helium.

As the helium detector 5 used for detecting the concentration of helium, it is possible to utilize a known mass spectrometer including a magnetic deflection mass spectrometer tube or the like. For example, a display portion provided in the main body portion 53 displays the concentration of helium detected by the helium detector 5, as a measurement value of the concentration of helium.

In the configuration as described above by using FIG. 2, the inspection container 3 (the container main body 31 and the lid 32) which includes the atmospheric air supply pipe 331 and the sampling pipe 341, and in which the gap flow channel 301 is formed corresponds to a leakage inspection device used for detecting leakage of the helium gas from the SUB 1.

Hereinafter, a technique of a leakage inspection using the inspection container 3 will be described.

As illustrated in FIG. 2, the SUB 1 filled with the helium gas is disposed inside the container main body 31. When the lid 32 is closed, the on-off valve V5 of the sampling gas supply mechanism 4 is opened, and the opening degree of the flow rate adjusting valve V4 is adjusted, so that the carrier gas is supplied to the inside of the inspection container 3 at a flow rate (flow rate at which the value of F/V described above becomes a value within a range of 0.01 to 0.05 vvm) set in advance.

For convenience of illustration, in FIGS. 1 to 8, each of the gas tube 111 and the drug solution tube 121 is shown in a state of extending upward. However, when the gas tube 111 and the drug solution tube 121 are constituted of a flexible material, the gas tube 111 and the drug solution tube 121 may be placed on the SUB 1, for example.

The carrier gas which has been supplied to the lower portion side inside the inspection container 3 via the atmospheric air supply pipe 331 flows toward the gap flow channel 301 formed on the upper portion side of the inspection container 3. That is, an upward flow of the carrier gas is formed from the lower portion side toward the upper portion side of the SUB 1 inside the inspection container 3.

In this case, if leakage has occurred in the SUB 1 disposed inside the inspection container 3, a part of the helium gas filled in the SUB 1 is incorporated into the carrier gas. Helium quickly diffuses inside an upward flow of the carrier gas due to its high diffusion rate. As a result, as illustrated in FIG. 2, for example, when the carrier gas is supplied from the atmospheric air supply pipe 331 provided in the vicinity of a lower end portion of the inspection container 3, the concentration of helium in the carrier gas is substantially constant in a region of the upper half of the overall height of the container main body 31, when seen within a plane intersecting a flowing direction of an upward flow regardless of the position where leakage occurs in the SUB 1.

Therefore, occurrence of leakage in the SUB 1 can be accurately detected by gathering the carrier gas and measuring the concentration of helium in this region. Particularly, uniformity of the concentration of helium inside an upward flow of the carrier gas is improved by connecting the sampling pipe 341 at a position higher than the connection position of the atmospheric air supply pipe 331. As a result, it is possible to reduce detection fluctuation, in which the concentration of helium in the gathered carrier gas rises or does not rise to a threshold value at which it is determined that leakage has occurred, caused by a difference in generation positions of leakage.

On the other hand, since helium is a gas lighter than atmospheric air, helium tends to rise to the upper portion side inside the inspection container 3 regardless of the flowing direction of the carrier gas inside the inspection container 3. In this case, unlike the inspection container 3 of the embodiment according to the present disclosure, if the gap flow channel 301 (exhaust portion) is not formed on the upper portion side, helium stays in an upper space of the inspection container 3.

Then, for example, even if a discharge port for the carrier gas is provided at the same height position as the connection position of the atmospheric air supply pipe 331 on the side wall surface of the inspection container 3 and the concentration of helium in the carrier gas gathered from this discharge port is measured, since helium convected to the upper portion of the inspection container 3 is not measured, leakage cannot be accurately detected. In addition, it takes a long time until the region in which helium stays reaches the height position in which the discharge port for the carrier gas is provided, so that leakage cannot be quickly detected.

In contrast, in the inspection container 3 of the embodiment according to the present disclosure, since the gap flow channel 301 is formed at a position in the vicinity of an upper end portion of the inspection container 3, that is, a downstream end of an upward flow of the carrier gas, the possibility that helium will stay in a region away from the flow of the carrier gas is reduced. As a result, it is possible to suitably measure the concentration of helium which has been incorporated into the carrier gas due to leakage from the SUB 1, and it is possible to quickly detect occurrence of leakage.

Here, as in the example illustrated in FIG. 2, when the carrier gas is supplied from one location on the lower portion side on the side wall surface of the inspection container 3, there is a possibility that the flow velocity of an upward flow may not be uniform at the height position at which the carrier gas is introduced so that a fast flowing region and a slow flowing region may be formed.

However, as described above, since helium has a high diffusion rate and rises inside the inspection container 3, an upward flow develops along the flowing direction, and helium merges in the course of a uniform flow, so that the uniform concentration of helium is realized within a plane intersecting the flowing direction. Therefore, inside the inspection container 3, an upward flow having a uniform flow velocity does not have to be formed within a plane intersecting the flowing direction from the lower portion side to the upper portion side. In other words, when an upward flow of the carrier gas is utilized, it may be said that leakage can be accurately detected even with a simple structure in which the carrier gas is only supplied from the atmospheric air supply pipe 331.

The presence or absence of leakage from the SUB 1 (inspection target) can be detected based on the presence or absence of a change in the concentration of the helium gas in the carrier gas flowing out via the sampling pipe 341 connected to the upper portion side of the inspection container 3, for example, whether or not a concentration exceeding a threshold value set in advance is measured, by utilizing the behavior of the carrier gas inside the inspection container 3 or the helium gas which has leaked from the SUB 1 as described above.

When only detecting the presence or absence of leakage, it is not essential to know the measurement values of the concentration of the helium gas measured by the helium detector 5. However, as illustrated in Examples described below, it is possible to approximately ascertain the size of a pinhole or the like causing leakage, based on the measurement values.

In regard to the carrier gas gathered from the sampling port 343, the concentration of helium is measured during a time set in advance by using the helium detector 5. When there is an inspection for the presence or absence of leakage in the SUB 1 (inspection target), the carrier gas stops being supplied, and the SUB 1 is taken out from the inspection container 3. Then, the helium gas filled in the SUB 1 is discharged, and the SUB 1 in which leakage is not detected is determined to be an SUB 1 which can be filled with contents.

The leakage inspection of the SUB 1 in the embodiment according to the present disclosure has the following effects. The SUB 1 filled with the helium gas is disposed inside the inspection container 3 partitioned from the outside, and an upward flow of the carrier gas is formed from the lower portion side toward the upper portion side of the SUB 1. Thereafter, the carrier gas is gathered at a position higher than a position at which the carrier gas is supplied from the atmospheric air supply pipe 331, and the concentration of helium is measured.

As a result, it is possible to prevent occurrence of a measurement error in the concentration of helium or a detection delay caused by helium staying inside the inspection container 3, and it is possible to accurately and quickly detect leakage in the SUB 1.

Next, another embodiment of the leakage inspection of the SUB 1 will be described with reference to FIGS. 3 to 8.

In FIGS. 3 to 8, reference signs to the same as those indicated in FIGS. 1 and 2 are applied to constituent elements to the same as those illustrated in the same diagrams.

In the embodiment illustrated in FIGS. 3 to 8, the points that the SUB 1 (inspection target) is placed on a receptacle 6 holding the SUB 1 and the inspection chamber is constituted by covering the receptacle 6 with an inspection cover 3a (bag-shaped container) are different from those in the embodiment according to FIG. 2 in which the inspection chamber is constituted as an independent inspection container 3. In addition, filling the SUB 1 with a helium gas, withdrawing helium after the leakage inspection, and filling the SUB 1 with contents are also performed inside the inspection cover 3a.

Figure 3:
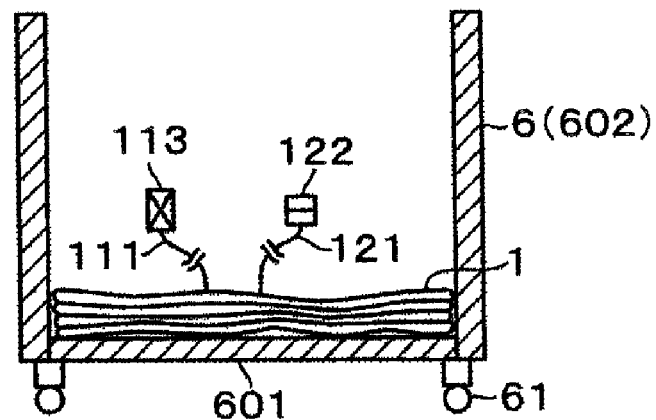
FIG. 3 illustrates a receptacle in which an SUB is disposed.

In the embodiment according to the present disclosure, as illustrated in FIG. 3, preparation of the leakage inspection starts in a state in which the SUB 1 not filled with contents is disposed inside the receptacle 6. In a case of a 3D-type SUB 1 formed into a rectangular parallelepiped shape or a cylindrical shape when the SUB 1 is filled with contents, the receptacle 6 includes a bottom plate portion 601 supporting the bottom surface of the SUB 1, and a side plate portion 602 supporting the SUB 1 from the side.

For convenience of illustration, FIGS. 3 to 8 illustrate a state in which the side plate portion 602 on a front surface side is detached in each diagram. Moreover, the receptacle 6 may be configured to be movable by providing a caster 61 on a lower surface side of the bottom plate portion 601.

In addition, in the SUB 1 of the embodiment according to the present disclosure, an aseptic filter 113 is provided in the terminal portion of the gas tube 111 through which the SUB 1 is filled with the helium gas.

Figure 4:
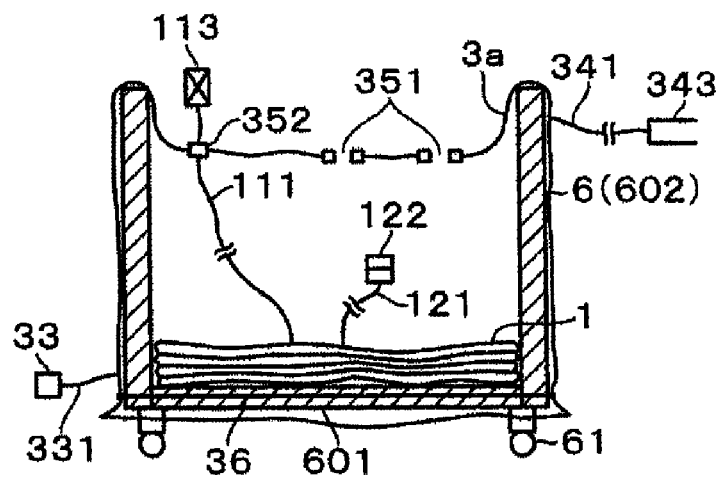
FIG. 4 illustrates a receptacle in which an inspection cover is mounted.

Subsequently, as illustrated in FIG. 4, the upper surface and the side surface of the receptacle 6 are covered with the bag-shaped inspection cover 3a, and the lower end portion of the inspection cover 3a is fastened by using a fastening tool 36 such as a rubber band and is brought into close contact with the lower end portion of the receptacle 6 (side plate portion 602), thereby closing the opening of the inspection cover 3a on the lower portion side.

The inspection cover 3a is constituted of a sheet made of resin or the like. When the receptacle 6 is covered with the inspection cover 3a, the atmospheric air supply pipe 331 for supplying the carrier gas to the inside of the inspection cover 3a is connected at a position corresponding to the lower portion side of the side plate portion 602.

In addition, the sampling pipe 341 for gathering the carrier gas flowing inside the inspection cover 3a is connected at a position corresponding to the upper portion side of the side plate portion 602. The position at which the atmospheric air supply pipe 331 or the sampling pipe 341 is connected is set based on an idea similar to that of the inspection container 3 described by using FIG. 2. The inspection cover 3a of the embodiment according to the present disclosure also corresponds to the leakage inspection device used for detecting leakage of the helium gas from the SUB 1.

Moreover, for example, two exhaust ports 351 which are exhaust portions for exhausting the carrier gas inside the inspection cover 3a are provided on the upper surface of the inspection cover 3a. In addition, an elastic hole portion 352 which can be opened and closed to take out the terminal portion (aseptic filter 113) of the gas tube 111 from the inspection cover 3a is provided on the upper surface of the inspection cover 3a.

Figure 5:
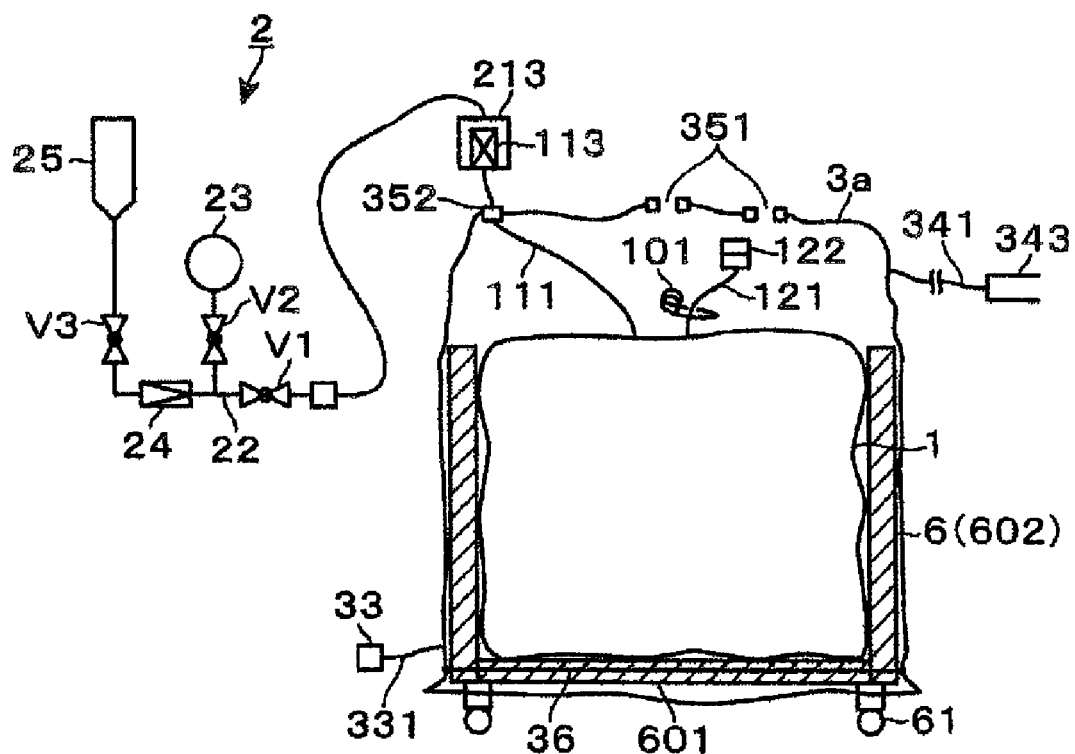
FIG. 5 illustrates an SUB being filled with a helium gas inside a receptacle in which an inspection cover is mounted.

When the receptacle 6 is covered with the inspection cover 3a and the aseptic filter 113 is taken out from the elastic hole portion 352, as illustrated in FIG. 5, the aseptic filter 113 is coupled to a filter connector 213 on the helium gas filling mechanism 2 side, and the SUB 1 is filled with the helium gas in a state of being disposed inside the receptacle 6. In this case, the drug solution tube 121 is closed by the pinch cock 101.

Figure 6:
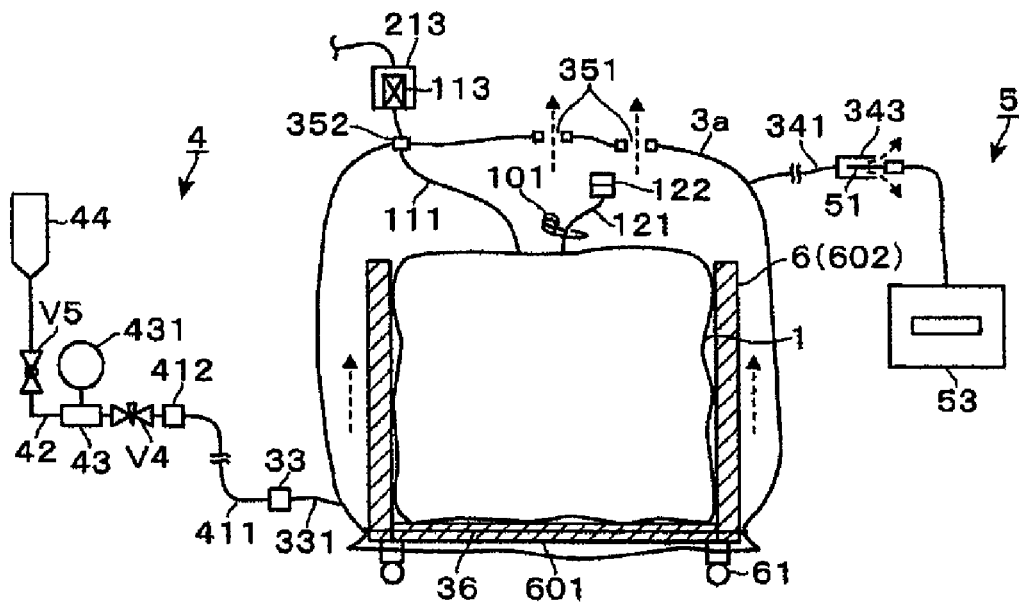
FIG. 6 illustrates an SUB in which a leakage inspection is performed inside an inspection cover.

Thereafter, when the SUB 1 is filled with the helium gas to a predetermined filling pressure, the carrier gas is supplied to the inside of the inspection cover 3a at a predetermined flow rate through the atmospheric air supply pipe 331 coupled to the sampling gas supply mechanism 4 (FIG. 6). In the example illustrated in FIG. 6, the carrier gas is supplied to the inside of the inspection cover 3a in a state in which the gas tube 111 is connected to the helium gas filling mechanism 2. However, similar to the example described by using FIG. 2, the gas tube 111 may be closed by the pinch cock 101 and may be separated from the helium gas filling mechanism 2.

When the carrier gas is supplied to the inspection cover 3a, the internal pressure rises, and the inspection cover 3a swells, thereby forming a space through which the carrier gas flows. Then, the carrier gas supplied from the atmospheric air supply pipe 331 to the lower portion side inside the inspection cover 3a flows toward the exhaust ports 351 formed on the upper surface of the inspection cover 3a, and an upward flow of the carrier gas is formed from the lower portion side toward the upper portion side of the SUB 1.

The point that occurrence of leakage in the SUB 1 is detected by gathering the carrier gas via the sampling pipe 341 when an upward flow of the carrier gas is formed, and measuring the concentration of helium is similar to that in the example described by using FIG. 2.

Figure 7:
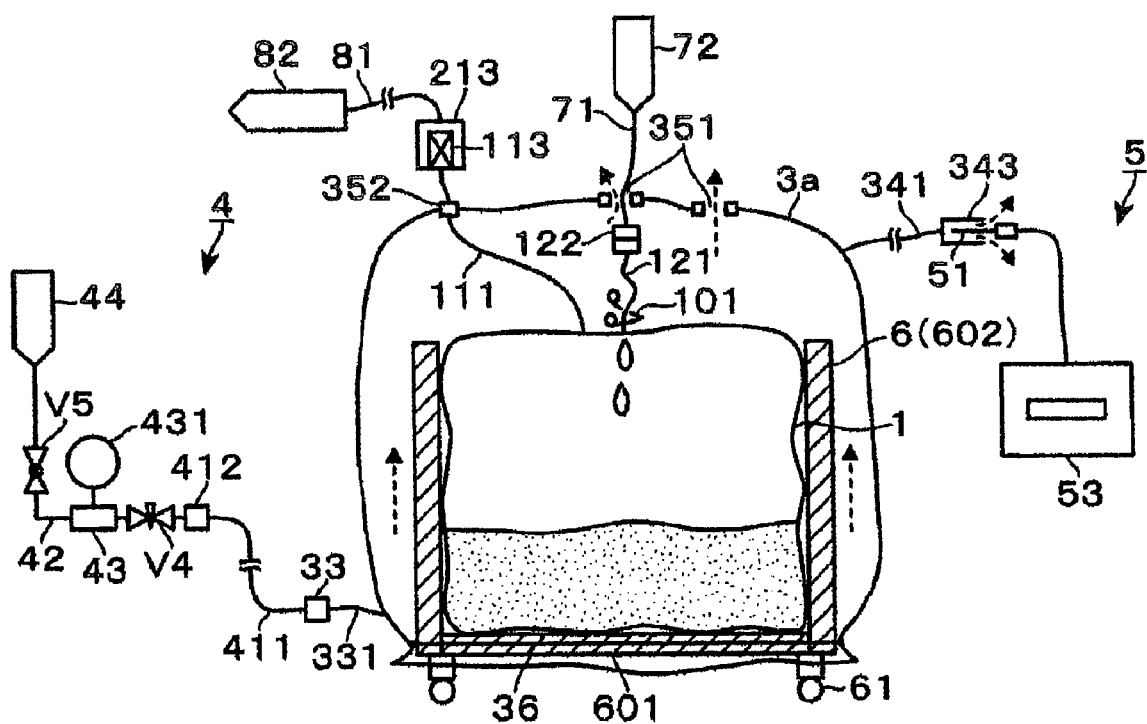
FIG. 7 illustrates an SUB in which filling of a drug solution and a helium collecting operation are performed inside an inspection cover.
Figure 8:
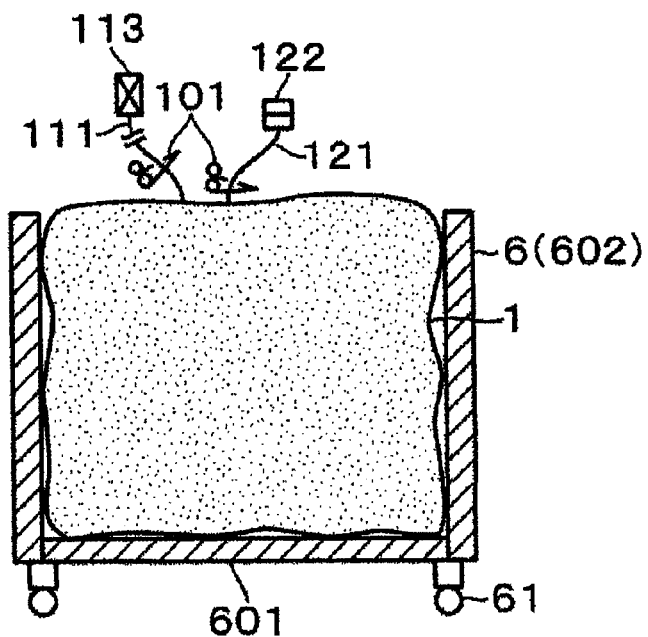
FIG. 8 illustrates an SUB in which filling of a drug solution has been completed.

In the embodiment according to the present disclosure, when leakage in the SUB 1 is not detected as a result of the leakage inspection, the SUB 1 is filled with contents (drug solution in the embodiment according to the present disclosure) inside the inspection cover 3a as it is, as illustrated in FIG. 7. For example, the aseptic connector 122 of the drug solution tube 121 is connected to a drug solution supply line 71 via the exhaust ports 351 described above, and the SUB 1 receives a drug solution from a drug solution supply portion 72.

In this case, a connection destination of the gas tube 111 may be switched to a helium collecting line 81, and a helium collecting portion 82 may collect the helium gas discharged from the SUB 1 in accordance with the filled drug solution. Since the helium gas with a high concentration can be prevented from flowing out to the inside of the inspection cover 3a by collecting the helium gas, it is possible to reduce an influence on the next leakage inspection caused by helium remaining inside the inspection cover 3a.

In addition, when contents such as a drug solution are not intended to be in contact with helium, the inside of the SUB 1 may be replaced with a different gas such as a nitrogen gas or atmospheric air, and the helium gas may be collected. Thereafter, the inside of the SUB 1 being full of the different gas may be filled with contents.

Here, in the example illustrated in FIG. 7, during a period in which the SUB 1 is filled with contents as well, the carrier gas is supplied to the inside of the inspection cover 3a, and the leakage inspection of the SUB 1 is continuously performed. In this manner, reliability of the leakage inspection can be improved by performing the leakage inspection immediately before filling of contents is completed.

However, the leakage inspection being continuously performed during the period of filling of contents is not essential. In order to facilitate handling of various instruments such as the drug solution tube 121 or the gas tube 111, the carrier gas may be continuously supplied to the inside of the inspection cover 3a only, and the concentration of helium does not have to be measured. In addition, naturally, supply of the carrier gas may be stopped during the period of filling of contents.

Furthermore, in the example illustrated in FIG. 7, a case, in which the helium gas being discharged is collected simultaneously while the SUB 1 is filled with contents, has been described. However, the order of performing the operations may be changed as necessary. For example, after the leakage inspection is finished, the SUB 1 may be brought into an empty state (state illustrated in FIG. 4) by suctioning and exhausting the helium gas inside the SUB 1. Thereafter, filling of contents may be performed.

When the above-described operations are finished and filling of contents is completed, the gas tube 111 and the drug solution tube 121 are detached from the drug solution supply line 71 and the helium collecting line 81, and the gas tube 111 and the drug solution tube 121 are closed by the pinch cock 101. Then, the inspection cover 3a is detached, and the receptacle 6 is transported to a desired process or a storage shed.

In the leakage inspection according to each of the embodiments described above, the sampling pipe 341 provided in the inspection container 3 or the inspection cover 3a is not essential. For example, the concentration of helium may be measured by inserting the probe 51 of the helium detector 5 into the gap flow channel 301 of the inspection container 3 or the exhaust ports 351 of the inspection cover 3a.

In addition, in the example of using the inspection cover 3a, the inspection chamber constituted by covering the receptacle 6, in which the SUB 1 is disposed, with the inspection cover 3a is not an essential factor. For example, the inspection chamber may be constituted by disposing the SUB 1 on a placement stage which does not have a caster or the side plate portion 602 and covering the upper surface side of the placement stage with the inspection cover 3a. Alternatively, the inspection chamber may be constituted by directly accommodating the SUB 1 inside the inspection cover 3a.

In these cases, for example, the carrier gas can be prevented from leaking out from the lower portion side of the inspection cover 3a by providing a plastic chuck for closing the placement stage and the inspection cover 3a or inner surfaces of the lower end portion of the inspection cover 3a.

Moreover, the container to be inspected, which can be inspected by a leakage inspection is not limited to the SUB 1. For example, the container to be inspected can also be applied to a leakage inspection of a vial which is closed by a rubber stopper (flexible portion).

EXAMPLES

Experiment 1

An influence on a helium leakage concentration with respect to a difference in filling pressure of a helium gas was investigated.

A. Experimental Conditions

The SUB 1 (volume of approximately 10 liters), of which the filling pressure of a helium gas (concentration of 100 volume %) was varied, was disposed in the inspection container 3 having the capacity of approximately 100 liter as illustrated in FIG. 3, and a chronological change in concentration of helium in the carrier gas (amount of increase from the concentration of helium of 5 ppm by volume in atmospheric air) gathered from the inspection container 3 was measured while supplying a carrier gas at 1.5 liter/min. The SUB 1 had no opening such as a pinhole, and it is assumed that the change in concentration of helium is caused by permeation through a resin sheet or leakage from each of the gas tube 111 and the drug solution tube 121 closed by the pinch cock 101.

Example 1-1

The filling pressure of the helium gas in the SUB 1 was set to 2 kPaG.

Example 1-2

The filling pressure of the helium gas in the SUB 1 was set to 5 kPaG.

Example 1-3

The filling pressure of the helium gas in the SUB 1 was set to 10 kPaG.

B. Experimental Results

Figure 9:
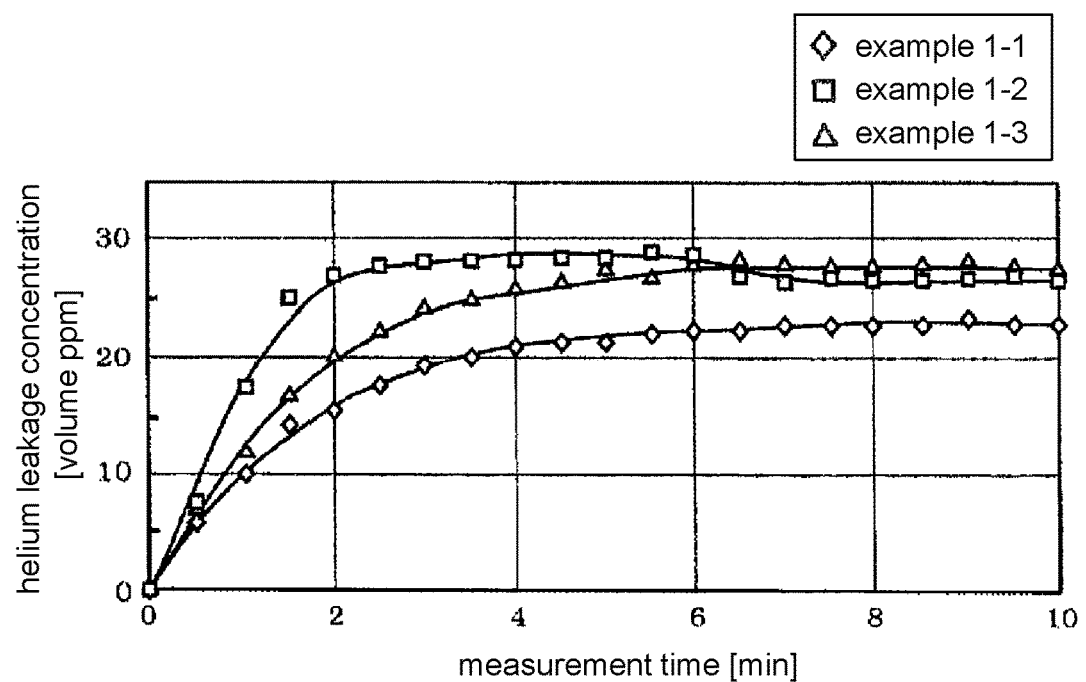
FIG. 9 is a first view illustrating Examples.

FIG. 9 illustrates the experimental results of Examples 1-1 to 1-3. In FIG. 9, the transverse axis indicates the measurement time [min], and the vertical axis indicates an amount of increase in a measurement value of the concentration of helium (which will also be referred to as a "helium leakage concentration") [ppm by volume] with respect to the concentration of helium in atmospheric air. Example 1-1 is plotted with an outlined rhombus, Example 1-2 is plotted with an outlined square, and Example 1-3 is plotted with an outlined triangle.

According to the results illustrated in FIG. 9, the concentration of helium became constant after approximately six minutes in all of Examples 1-1 to 1-3. As described above, these Examples show a change in concentration of helium incorporated into the carrier gas when there is no opening such as a pinhole. Therefore, when an opening is present, the concentration of helium becomes higher. Therefore, even if the filling pressure is approximately 2 kPaG, the concentration of helium can be measured, and leakage in the SUB 1 can be sufficiently detected.

Experiment 2

An influence on the helium leakage concentration with respect to a difference in the number of openings (pinholes) was investigated.

A. Experimental Conditions

A pinhole was bored in the SUB 1 with a needle, and a chronological change in concentration of helium was measured under experimental conditions similar to those in Example 1-3 of Experiment 1.

Example 2-1

One pinhole having a diameter of 50 μm was bored in the SUB 1.

Example 2-2

Two pinholes having a diameter of 50 μm was bored in the SUB 1.

Example 2-3

Three pinholes having a diameter of 50 μm was bored in the SUB

B. Experimental Results

Figure 10:
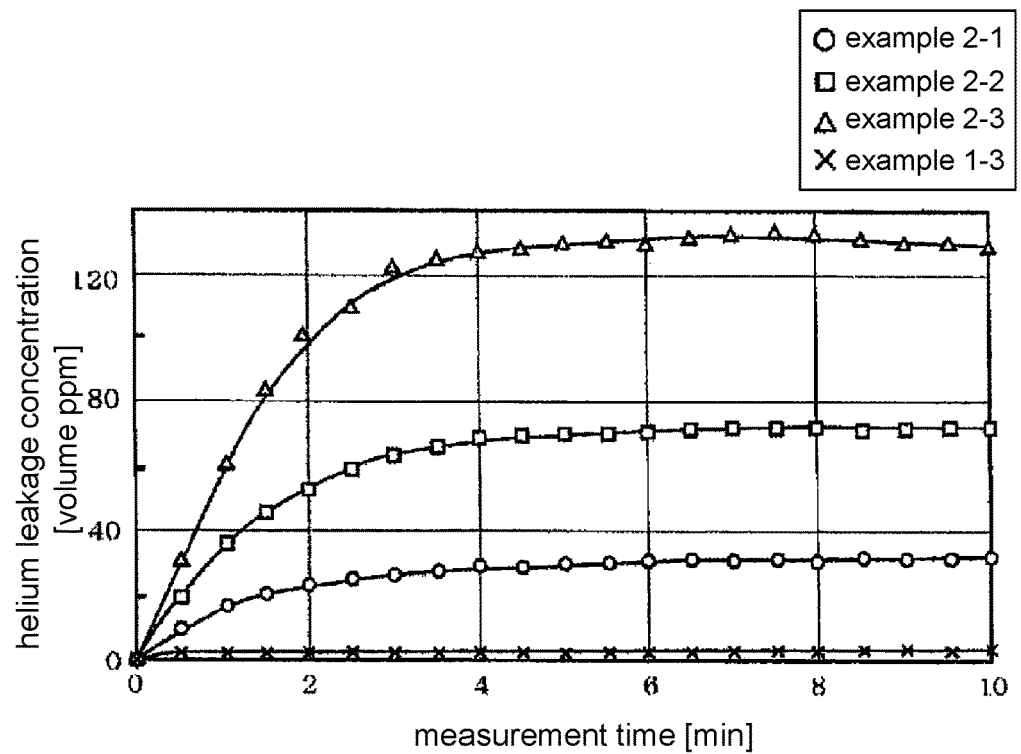
FIG. 10 is a second view illustrating Examples.

FIG. 10 illustrates the experimental results of Examples 2-1 to 2-3. The transverse axis and the vertical axis in FIG. 10 are similar to those in FIG. 9. Example 2-1 is plotted with an outlined circle, Example 2-2 is plotted with an outlined square, and Example 2-3 is plotted with an outlined triangle. In addition, for reference, a change in helium leakage concentration in Example 1-3 is plotted with an X-mark.

According to the results illustrated in FIG. 10, the helium leakage concentration was high in all of Examples 2-1 to 2-3 compared to Example 1-3 having no pinhole. Therefore, it was checked that leakage in the SUB 1 could be detected by this method. In addition, it was also ascertained that the helium leakage concentration became high in the order of Example 2-1, Example 2-2, and Example 2-3, as the number of pinholes increased.

Therefore, the size of an opening such as a pinhole can be ascertained by the technique. As a result, it is possible to widen the range for detecting an opening to a small diameter region (for example, 20 μm or smaller), which has been difficult to be detected by a differential pressure method or the like, by utilizing a proportional relationship between the size of the opening in the SUB 1 and the measured concentration of helium which has leaked into the carrier gas.

Experiment 3

An influence on a helium measurement concentration was investigated by varying the ratio (F/V [vvm]) of the supply flow rate F [liter/min] of the carrier gas to the volume V [liter] of the remaining space inside the inspection container 3 in a state in which the SUB 1 was accommodated.

A. Experimental Conditions

The SUB 1 having no opening was filled with a helium gas at a filling pressure of 2 kPaG, the value of F/V was varied by varying the flow rate of the carrier gas, and a chronological change in concentration of helium was measured.

Reference Example 3-1

The flow rate of the carrier gas was set to 1.0 liter/min with F/V=0.012 vvm.

Example 3-2

The flow rate of the carrier gas was set to 1.5 liter/min with F/V=0.018 vvm.

Example 3-3

The flow rate of the carrier gas was set to 2.0 liter/min with F/V=0.024 vvm.

B. Experimental Results

Figure 11:
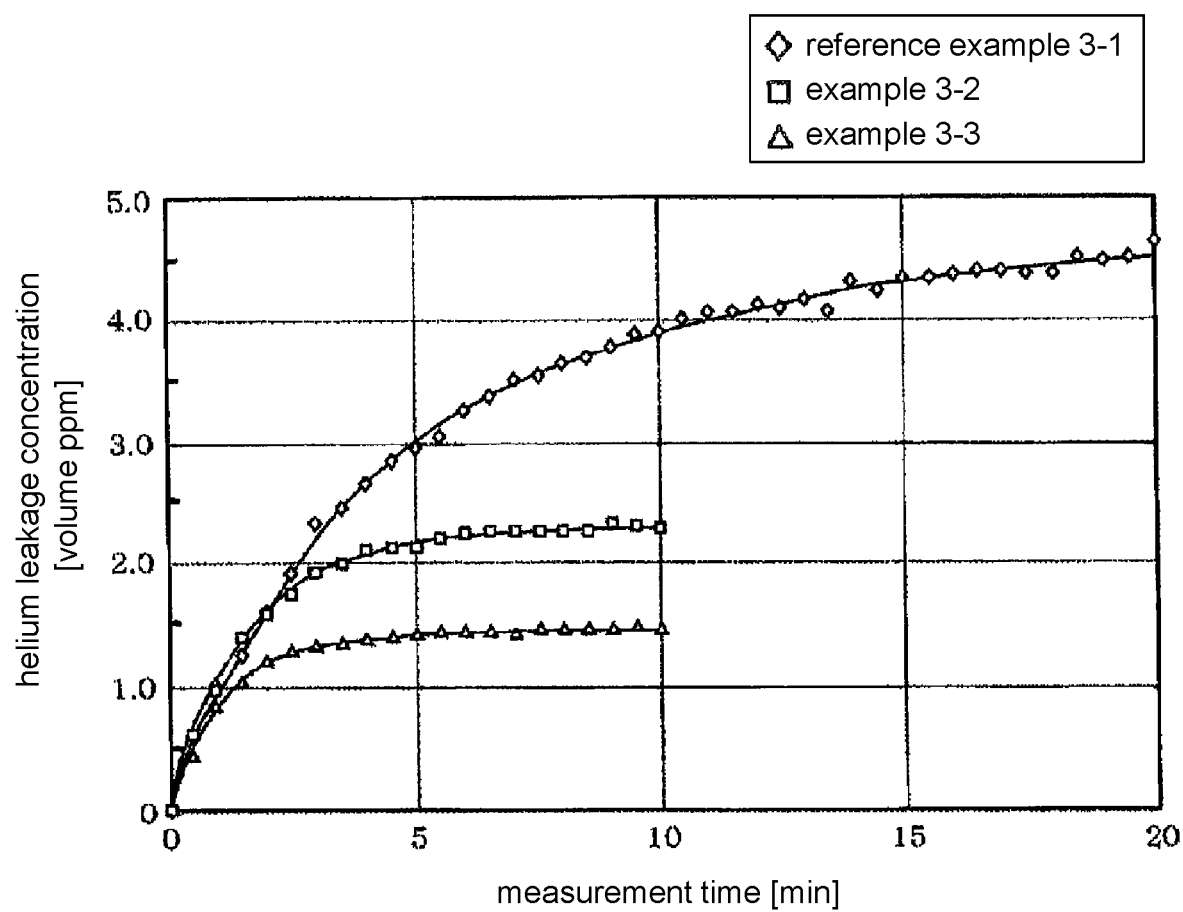
FIG. 11 is a third view illustrating Examples.

FIG. 11 illustrates the experimental results of Reference Example 3-1 and Examples 3-2 and 3-3. The transverse axis and the vertical axis in FIG. 11 are similar to those in FIG. 9. Reference Example 3-1 is plotted with an outlined diamond, Example 3-2 is plotted with an outlined square, and Example 3-3 is plotted with an outlined triangle.

According to the results illustrated in FIG. 11, in Examples 3-2 and 3-3, the change in helium leakage concentration became constant after approximately five minutes from the start of supplying the carrier gas. On the other hand, in Reference Example 3-1, the helium leakage concentration was continuously rising for approximately 20 minutes after the carrier gas started to be supplied. As the reason thereof, it is assumed that if the value of F/V is low, it may take a relatively long time until the dilution of helium due to the carrier gas becomes uniform inside the inspection container 3. However, even in Reference Example 3-1 as well, it is assumed that if the helium leakage concentration is measured by taking a longer time, the helium leakage concentration becomes uniform.

In addition, when only detecting the presence or absence of an opening having a possibility that contents will leak without determining the size of the opening, there is no need to wait for the timing at which the helium leakage concentration becomes constant. Accordingly, it is natural that leakage can be detected even under the conditions of Reference Example 3-1.

In this manner, in the present disclosure, the container to be inspected filled with an inspection gas containing helium is disposed inside the inspection chamber partitioned from the outside, and an upward flow of the carrier gas is formed from the lower portion side toward the upper portion side of the container to be inspected. Thereafter, the carrier gas is gathered at a position higher than a position at which the carrier gas is supplied, and the concentration of helium is measured. As a result, it is possible to prevent occurrence of a measurement error of the concentration of helium or a detection delay caused by helium staying inside the inspection chamber, and it is possible to accurately and quickly detect leakage in the container to be inspected.

Hereinabove, with reference to the drawings, the embodiment according to the present disclosure and Examples have been described as examples. However, the present disclosure is not limited to the embodiment and Examples. Within a range not departing from the gist of the present invention, all the modifications and changes with respect to the embodiment or Examples belong to the technical scope of the present invention.

The invention claimed is:

1. A leakage inspection method for a container to be inspected having a deformable flexible portion, the leakage inspection method comprising:
    a step of filling the container to be inspected, with an inspection gas containing helium;
    a step of disposing the container to be inspected filled with the inspection gas inside an inspection chamber partitioned from outside, wherein the inspection chamber is partitioned from the outside in an unsealed state, and forming an upward flow of a carrier gas, of which a concentration of contained helium is different from the concentration of helium contained in the inspection gas, from a lower portion side toward an upper portion side of the container to be inspected; and
    a step of detecting leakage of the inspection gas filled in the container to be inspected, based on measurement results of a concentration of helium in the carrier gas gathered at a position higher than a position at which the carrier gas is supplied to the inside of the inspection chamber,
    wherein an exhaust portion for the carrier gas that opens to outside air is located in the inspection chamber at a position above the container to be inspected disposed inside the inspection chamber,
    the upward flow is formed by exhausting the carrier gas from the exhaust portion, and
    the carrier gas is gathered from the upward flow of the carrier gas at a sampling portion installed at a height position between a position at which the carrier gas is supplied to the inside of the inspection chamber and the exhaust portion.

2. The leakage inspection method for a container to be inspected according to claim 1, further comprising:
    a step of filling the container to be inspected, with contents inside the inspection chamber when leakage of the inspection gas is not detected.

3. The leakage inspection method for a container to be inspected according to claim 1, further comprising:
    a step of collecting the inspection gas filled in the container to be inspected, after the step of detecting leakage of the inspection gas.

4. The leakage inspection method for a container to be inspected according to claim 1,
    wherein the container to be inspected is a deformable bag-shaped container.

5. The leakage inspection method for a container to be inspected according to claim 1,
    wherein the inspection chamber is a bag-shaped cover covering a space around the container to be inspected.

6. The leakage inspection method for a container to be inspected according to claim 5, wherein the container to be inspected is disposed inside a receptacle holding the container to be inspected, and the inspection chamber is configured to cover the receptacle and the container to be inspected inside the receptacle with the bag-shaped cover.

7. The leakage inspection method for a container to be inspected according to claim 1, wherein a filling pressure of the inspection gas with respect to the container to be inspected is higher than 0 PaG and is less than an upper limit value for a withstanding pressure of the container to be inspected.

8. The leakage inspection method for a container to be inspected according to claim 1, wherein a ratio of a flow rate of the carrier gas to a volume of a remaining space inside the inspection chamber in a state in which the container to be inspected is accommodated is a value within a range of 0.01 to 0.05 vvm.

9. A leakage inspection device for a container to be inspected having a deformable flexible portion, the leakage inspection device comprising:

an inspection chamber which is partitioned from outside in an unsealed state and in which the container to be inspected filled with an inspection gas containing helium is disposed;

a carrier gas supply portion which supplies a carrier gas, of which a concentration of contained helium is different from the concentration of helium contained in the inspection gas, to a lower portion side of the inspection chamber;

an exhaust portion which exhausts the carrier gas from a position above the container to be inspected to outside air in order to form an upward flow of the carrier gas from the lower portion side toward an upper portion side of the inspection chamber; and a sampling portion which gathers the carrier gas from the upward flow of the carrier gas at a position higher than the carrier gas supply portion in order to detect the leakage of the inspection gas filled in the container to be inspected based on measurement results of a concentration of helium contained in the carrier gas, wherein the sampling portion is installed at a height position between the carrier gas supply portion and the exhaust portion.

* * * * *